Dec. 18, 1945.　　　J. A. HINDLE　　　2,391,313

PYROMAGNETIC MOTOR

Filed Dec. 13, 1944

INVENTOR.
JAMES A. HINDLE
BY Pennie, Davis, Marvin & Edmonds
ATTORNEYS

Patented Dec. 18, 1945

2,391,313

UNITED STATES PATENT OFFICE 2,391,313

PYROMAGNETIC MOTOR

James Arthur Hindle, Punjab, British India

Application December 13, 1944, Serial No. 568,044
In British India November 23, 1943

9 Claims. (Cl. 171—125)

This invention relates to a method of and apparatus for the thermo-dynamic conversion of heat energy into energy or work in some other form.

The invention has for its object to utilise the known phenomenon that certain magnetic material upon being heated above a temperature, which can readily be ascertained, will become nonmagnetic and when allowed to cool again will regain its magnetisable properties. For example, iron at a temperature of about 700° C. and above is non-magnetic. Allowed to cool to some temperature below 700° C. it will again be magnetisable and will respond to magnetic attraction.

It is the object of this invention to utilise this property possessed by certain magnetic metals and alloys.

The invention thus relates to utilising metals or metal alloys of the description or nature which are at ordinary temperatures magnetic, but which can, upon being heated to a temperature (which may readily be determined), be rendered non-magnetic, but which metal, upon cooling again through an appropriate range of temperature (also readily to be determined) will regain its magnetic properties, so as to be attracted once again by a magnet and will recover its magnetic or magnetisable properties even when the cycle is repeated again and again continuously.

The object of the invention is to apply a manner of converting heat energy produced in any desired manner into energy of another form by mounting for rotational or other movement in a magnetic field a member made partially or wholly of magnetic metal of a nature which can be made substantially completely non-magnetic upon being heated beyond a critical temperature or temperature range but which will regain its magnetic properties upon cooling again below such temperature or range, applying repeatedly to a part at least of said member increments of heat whereby to raise the temperature of said part to above said critical temperature or temperature range to render the metal of said part non-magnetic, followed by a cooling of said part to below said temperature or temperature range to cause said part to recover its magnetic properties, the lines of flux of said magnetic field being so positioned and directed as to tend to cause or permit of relative movement of said member in said magnetic field as a part at least of said member is made alternately non-magnetic and magnetic, and converting the said relative movement into useful work of a form other than heat energy.

Another object is to apply a manner of producing thermo-dynamic conversion of energy wherein a member is mounted for movement in a magnetic field, which member is made partly at least of magnetic material of a nature which can be made non-magnetic upon being heated above a determined temperature and recover its magnetic properties on cooling below said temperature, applying heat in sequence to parts of the said member whereby to demagnetise the member at said parts, cooling said parts after movement thereof has taken place whereby to cause the magnetic properties thereof to be recovered, so that the said member is caused to move under the influence of the magnetic forces applied thereto owing to one side, part or portion thereof being non-magnetic and another side, part or portion thereof being magnetic, said member being so mounted for movement in the magnetic field that said magnetisable side, part or portion thereof, tends to align itself to conform to the magnetic lines of flux in said magnetic field and whereby the member will move on its mountings, the said movement being harnessed to produce mechanical, electrical or other energy than heat energy.

Another object is to produce a conversion of energy which consists in mounting for movement in a magnetic field a member made of a material having the properties herein described and which can be made magnetic and non-magnetic in succession by temperature changes applied thereto, applying temperature changes to said member to cause one portion thereof to be magnetic and another portion to be non-magnetic, so that the said member is in unstable equilibrium on its mountings as regards reaction to magnetisation in said magnetic field and is thereby caused to move in said field, and converting said movement into useful work.

With the above and other objects in view the invention comprises in a system for producing a thermo-dynamic conversion of energy, the combination of means for producing an electro-magnetic field, a member made partially or wholly of a magnetic material of a nature which may be made substantially completely non-magnetic upon being heated above a critical temperature range but which will regain its magnetic properties upon cooling again below such temperature range, said member being mounted within the magnetic field of said electro-magnetic means, means whereby a part at least of said member may be repeatedly heated above and cooled below said critical temperature range, whereby said member may be caused to be in unstable magnetic equilibrium relatively to said electro-magnetic field, and relative movement may thus be engendered between said member and said electro-magnetic means by said heating and cooling, and further means being provided for converting said relative movement into energy other than heat energy.

The invention also includes apparatus for carrying out the thermo-dynamic conversion of energy comprising a magnet (or electro-magnet) to produce a magnetic field, a rotor member mounted in said field and adapted to rotate between between the poles of the magnet, said rotor member being formed partly or wholly of a magnetic material capable of being rendered non-magnetic on heating to above a determined temperature and of recovering its magnetic properties upon cooling, and a heating means adapted so to direct heat to be converted upon said rotor member and in such position thereon, as to cause said member to rotate in said magnetic field under the magnetic lines of force operating thereon.

In such apparatus the said heating means may be positioned and adapted to apply heat sufficient to render a part of the said rotor member temporarily non-magnetic locally at the point of application of heat. The said heating means may be so positioned relatively to the magnetic field that it is adapted to apply heat to the rotor member locally at a point where the said member, in rotating, is leaving the position opposite, or adjacent to, to a pole of the magnet where the magnetic flux is ordinarily greatest and is thus moving into or towards a position where the magnetic field is weaker.

A multi-pole electro-magnet may be used and the heating means apply heat at more than one point of application to the rotor.

In this apparatus cooling means may be applied to said rotor member to restore the magnetic properties therein. The said cooling means may be applied to the rotor member locally at a point where the said member, in rotating, is approaching a position near to, or opposite to, the nearer edge of the other (or next) pole of the magnet.

According to an important and almost essential feature of this invention the rotor member is made partially or wholly of an iron-nickel alloy. This iron-nickel alloy may contain more than 30% of nickel. According to the preferred composition approximately 50% iron and 50% nickel will be used. One or more other components may be added to the nickel and iron. The rotor member may be made partly at least of any metal or metallic alloy which has magnetic properties and which can be caused to lose said magnetic properties when heated above a determined temperature and will regain said magnetic properties upon cooling again, or which can be made to have such properties after appropriate heat treatment.

This apparatus may be one in which the rotor member has a core of magnetic material, for example discs of soft magnetic iron or cobalt iron, and an outer cover of iron-nickel alloy. The rotor is mounted for rotation on a shaft and may have inner parts mounted on said shaft which are of a magnetic material, for example discs or laminae of soft magnetic iron, and an outer covering layer to the rotor formed of a multiplicity of separate strips of iron-nickel alloy. This outer covering or sheath on the periphery of the rotor may thus be of strips of iron-nickel alloy and electrical means be provided to produce eddy currents and heating in said strips to render said strips non-magnetic whilst so heated as the said strips pass in succession between the poles of said electrical means.

In this apparatus the heating means may be adapted to supply heating to a part of the rotor member, in the form of a flame, heated air or gas, or electrically either induced in said rotor member by means of eddy currents or by other electrical means, the heat being applied at a temperature above that at which the rotor material will locally lose its magnetic properties when such heat is applied thereto at a point or area. The heating may be effected by causing heated air or gas to pass through ducts or passages provided in the rotor member. The heating medium may be an inert heated gas, and the heating may thus be carried out by using hot or heated exhaust gases from an internal combustion engine, for example the exhaust from a Diesel engine, or hot chimney gases from a furnace or boiler.

The heating means may alternatively be electrical means adapted to heat a desired iron-nickel part of the rotor member by heating currents for example by induced eddy currents, passing through the iron-nickel strips which form the outer covering of the rotor.

Preferably the heating means is applied to or the heating medium is directed upon a relatively small area exposed thereto by the revolving rotor. The cooling of the rotor member may be effected by means, for example nozzles, adapted to supply a blast of cooling air or gas. This air or gas may first be compressed, thereafter cooled and then released to be further cooled by the expansion at the moment it is directed upon the rotor. Ducts or passages may be provided in the rotor member to enable the cooling medium to be passed through said ducts or passages for cooling the rotor.

The heating and the cooling will preferably be applied to areas of the rotor member spaced away from the axis of rotation.

This rotor member may be in the form of a disc or drum and the heating or cooling medium, or both, be applied to the side of the disc or end of the drum to pass through ducts or passages made through the disc or drum from side to side, or end to end, thereof. A hollow cap or hood may be fitted to the rotor member, by and through which cap or hood the heating medium or cooling medium is directed to desired surfaces on the rotor. A partition may divide the heated gases from the cooling gases whereby each may be directed upon a desired area on the side of the rotor member.

According to one preferred embodiment of the apparatus the heating and cooling means are so positioned relatively to the rotor that the heating and cooling are applied in sequence to the rotating rotor at spaced points so as to cause only one side, segment or sector of the rotor temporarily to lose its magnetic properties and to regain them once more on cooling through the necessary temperature range.

Alternatively to heating with a fluid such as air or gas, a heating bath may be provided and the member may be heated with a heated liquid contained in said bath, for example heated mercury, into which the rotating rotor member dips at one point, to be heated in the said liquid to a temperature at which it is non-magnetic before leaving the liquid bath.

The apparatus may thus be one in which the rotor member is a disc-like or drum-like member, the outer parts at least of the disc or cylinder being formed of a metal which can alternately be made non-magnetic and again magnetic by temperature variation.

The rotor member is preferably formed partly at least of a multiplicity of soft iron or cobalt iron discs or laminae mounted upon, or adapted to rotate with a shaft, the laminae being so arranged as to reduce or more or less eliminate eddy losses. These laminae are arranged to lie in planes which are perpendicular to the axis of rotation of the rotor. The rotor will have a sheath of strips of iron-nickel alloy.

According to another optional feature, in the apparatus the means for producing the magnetic field are mounted for rotation and the angular position of the magnetic field relatively to the axis about which the rotor member is intended to rotate is capable of being adjusted by a shifting means whereby the angle thereof relatively to the points of heating and of cooling of the rotor can be changed. Alternatively, means may be provided whereby the angular position of the heating and cooling means relatively to the axis of the magnetic field may be capable of being moved.

According to another form which the apparatus may take; but which is not the preferred form at present, it may comprise a magnet (or electro-magnet) to produce a magnetic field, a pivoted or swingable member formed partly or wholly of a magnetic material which can be rendered non-magnetic on heating and will recover its magnetic properties upon cooling, means for controlling said member (i. e. a spring or gravity), and a source of heat adapted to heat said member when drawn over by the magnet against said controlling means.

In a preferred manner of producing thermo-dynamic conversion of energy as hereinbefore explained, use may be made of a zone or area on the movable member in which the member is rendered non-magnetic by heating, the said heated zone or area being caused to travel continuously, during operation, around the said member—the rest of the magnetisable parts of said member being in a condition in which it has by cooling regained its magnetic properties.

The invention will be described with reference to the accompanying drawing in which like reference numbers relate to like parts throughout, and in which:

Figure 1 shows diagrammatically a means for carrying out the principle.

Figure 1:
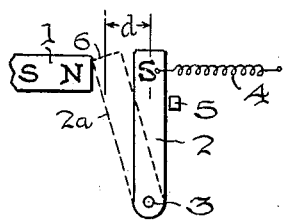
Fig. 1 is a diagram showing a simple form of apparatus to illustrate the principles to be applied.

In this figure a bar magnet 1 has a north pole N and south pole S. A soft iron armature 2 is pivoted at 3 and is held by a weak spring 4 against a stop 5.

Upon the magnet 1 being brought to the position shown. With the armature 2 at distance $d$ from the near pole of the magnet it attracts the armature which is drawn, against the resistance of the spring 4, to the dotted position 2a to make contact with the pole face. In doing this work is performed by the armature since it has overcome the resistance of the spring and has moved through the distance $d$.

If, now, heat is applied to the armature 2 at the point 6 where the armature makes contact with the pole face N of the permanent magnet 1 until the armature reaches about 700° Cent., the armature will return to its original position, under the influence of the spring 4, since iron at the temperature of 700° Cent. and above is non-magnetic. Allowed subsequently to cool to some temperature below 700° Cent., the armature will again become magnetic and be attracted and, coming again into contact with the continuous supply of heat at 6, will be again returned to its original position for the reasons already given.

A fraction of the heat supplied at 6 is, therefore, converted from heat energy to mechanical energy in each cycle.

Such an arrangement is, then, possible and works in the manner indicated, but the arrangement is not practical as an efficient method of thermo-dynamic conversion for the following reasons:

(a) The working temperature (700° C.) too high.

(b) Temperature difference necessary to the functioning of the arrangement is too great, because the soft iron requires to cool off through too wide a range from 700° C. to become magnetic again.

(c) Since the magnetic attractive force varies inversely as the square of the distance $d$ the armature arrangement as shown has a poor efficiency.

With regard to (a) and (b) in the foregoing. This high operational temperature of something greater than 700° Cent. and the consequent rather large temperature change or range needed between the temperature at which the soft iron is non-magnetic and the temperature at which it has regained its full magnetic properties can be successfully avoided by using an alloy of nickel and iron. Alloys of these magnetic metals have been found to be non-magnetic at temperatures of circa 170° Cent. and magnetic at temperatures only a few degrees Cent. below 170° Cent., while their magnetic properties (e. g., the induction density obtainable with normal magnetising force) are believed to be sensibly the same as those of the best Swedish soft iron, such as is used for dynamo armature stampings. A particularly good alloy is one of 50% iron and 50% nickel.

Figure 4:
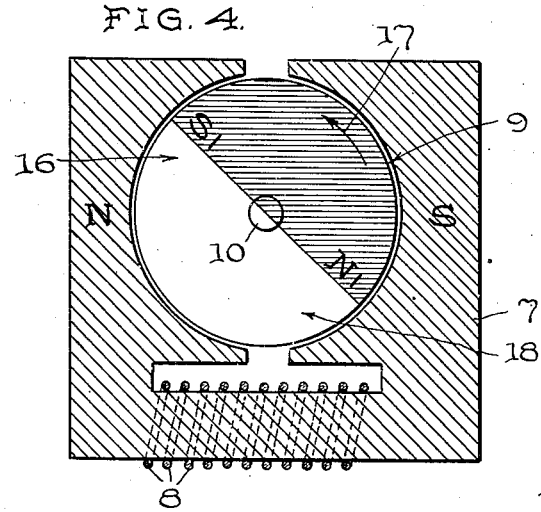
Fig. 4 is a diagram of apparatus which may be used.

In Figure 4 an electro-magnet 7 (energised from an external source) by a current passing through the coil 8 is shown in which is placed a thin disc 9 of nickel-iron alloy, mounted rigidly on a shaft 10, in bearings not shown, and free to rotate in the magnetic field of the electro-magnet.

If, now, the arrangement is such that heat energy is constantly supplied to the unshaded portion of the disc, so that the temperature of this portion is constantly maintained at about 170° Cent., and the metal forming this part of the disc is therefore non-magnetic, while the temperature of the shaded portion of the disc is constantly maintained at a temperature somewhat less than circa 170° Cent., so that the metal thereof is again rendered magnetic, the disc will continue to rotate with its supporting shaft in the bearings provided while these conditions are fulfilled, and the heat energy supplied will be converted by this arrangement to mechanical energy available at the shaft. The direction of rotation will be anti-clockwise as shown. By these means it is thus possible to produce somewhat analogous magnetic conditions as those which obtain in an ordinary direct current electric motor when such motor is supplied with electricity. As the Figure 4 indicates, a constant south pole S1 is maintained in the position shown and is, therefore, under constant attraction by the north pole N, whilst the same conditions with reversed magnetic polarity is constantly maintained at N1 and S so that rotation results.

Based upon the observations and theory given a practical machine may be designed for commercial use. Figure 4 shows this diagrammatically, whilst Figures 5, 6, 7 and 8 are views of parts of the machine. The rotor 9 consists of a series of thin sheet discs or stampings 9a of the nickel-iron alloy, mounted as shown in the elevation Fig. 6 on a steel shaft 10 with a narrow space between each disc, this space varying to suit varying thicknesses of discs and various types of machine.

Figure 5:
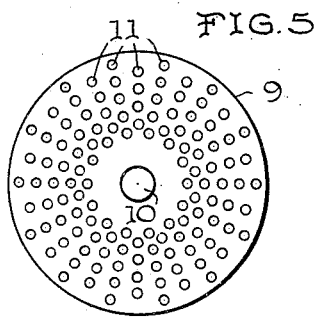
Fig. 5 shows, to a larger scale than Fig. 4, a side elevation or end view of a rotor disc or drum.

In the view Figure 5 of a disc, a series of holes 11, 11, are shown as stamped in each disc, the whole on being assembled being lined up so that the said holes form heating ducts or cooling ducts. In Figure 5 only part of the surface is shown as provided with these ducts, but they are provided in the four quadrants, of course. The diameter of the bores of these ducts and their arrangement is such that the permeability of the magnetic path is not reduced materially, i. e., the magnetic strength is maintained. The diameter of the rotor is preferably large as against its width.

The electro-magnet 7 is conveniently made of soft iron and is made magnetic by an external source of electric supply through the energising coil 8.

In the tunnel of this electro-magnet the rotor 9 works, the air-gap between the rotor and the tunnel face preferably being made of an irreducible minimum width. The rotor 9 is suitably supported on bearings, shown in the rotor end cap or hood 12, see Figures 7 and 8. In one of the end caps 12 an entrance 13 for heated gases or for the hot gases from the combustion of any fuel is provided, through which said gases are forced, while cooling air is forced through the cooling duct 14.

The hood or cap 12 may be dome-shaped and the interior be divided by a partition 15 to divide the hot gases from the cooling gases or air. The heated gases entering through the opening 13 are directed upon the part 16 to heat the rotor at such point.

This point 16 may conveniently be about that shown in Figure 4, the rotor moving in the anticlockwise direction as shown by the arrow 17. At this point 16 the rotor is heated to that temperature or preferably just above that temperature at which the metal of the disc 9 is caused to be non-magnetic. In spinning as the disc passes from the point 16 to the point 18 the disc is non-magnetic and is not attracted by the pole N of the electro-magnet 7. At or adjacent to the point or area 18 the disc 9 is cooled by coming opposite to the supply of cooling air or gas which is supplied through the opening 14 in the cap 12. The temperature of this part of the disc rapidly drops to below that temperature at which the metal of the disc regains its magnetic properties. The final result which is to be aimed at is to obtain a revolving disc part of which is momentarily non-magnetic and hence not attracted by the poles of the magnet over an area such as the unshaded area of Figure 4 and is again magnetic when in the position shown in the shaded area, these conditions being maintained continuously as the disc or rotor rotates. When the desired results are achieved the rotor is non-magnetic in one part and magnetic over the rest of its area and when mounted as shown for rotation in the magnetic field of the electro-magnet tends to rotate and to keep rotating continuously in the direction shown by the arrow 17.

With a nickel-iron alloy having an approximate composition of 50–50 the temperature needed to cause the metal to become non-magnetic is round about 170° C., whilst it regains its magnetic properties again on the metal falling in temperature through a few degrees. Assuming for the moment that the necessary fall in temperature to regain the magnetic properties is one of 5° C., it would be possible to maintain the temperature of the revolving rotor at 165° C. throughout the greater part of the rotor but to heat it to 170° for a part of the area in order that the member owing to its variations in magnetic properties shall be in unstable equilibrium in the magnetic field and will thus be in such a condition that it will rotate.

The cooling from 170° C. to 165° C. might be effected partly by the self-cooling of the rotating member assisted by the conversion of some of the heat supplied into useful work in causing and maintaining the rotation of the rotor. It, however, appears advisable to apply positive means for cooling—such as an air blast.

The best points at which heating and cooling should be applied for producing the best results will depend upon the design of the machine, the metal used, and the speed at which the machine is required to run. The points may need to be altered as the speed increases from the starting to the intended speed of operation.

The rotor end cap may itself be capable of being rotated through a variable angle. The object of this being to enable the best working angle to be obtained. The arrangement meets the conditions required for efficient working, which may be summarised as follows:

(a) Rapid addition of heat to, and abstraction of heat from, the rotor.

(b) A minimum air-gap between individual laminae, or discs, of the rotor and between the latter and the pole piece of the electro-magnet, thus ensuring the maximum flux, or magnetic strength, in the reaction field.

(c) A minimum of heat addition to and subtraction from the more central parts of the rotor which take no part in the reaction between the heat supplied and the magnetism of the system.

With regard to the condition (c) last referred to, it may be found inadvisable to heat the rotor right up to the centre of the rotor and accordingly the heating ducts may if desired be in the outer parts of the rotor—i. e. towards the periphery—instead of throughout the full area of the rotor. On the other hand it may be that it will be found advisable to maintain the parts adjacent to the axis of or the shaft of the rotor permanently at a temperature at which these parts are non-magnetic— and this may be done by modifying the heating or the cooling or by modifying the areas over which the heated gases or the cooling gases are applied, or by both modifying the heating or cooling and modifying the areas over which the heated gases or the cooling gases are applied.

In certain cases it may be desired definitely to avoid the magnetisation of the central parts of the rotor, and the rotor may be formed with a central part which is non-magnetic.

As an alternative to heated gases being used for the purpose named, the heat might be supplied through some other medium, the rotor in this case being immersed in a suitable liquid metal (such as mercury) heated to the desired temperature.

Figure 2:
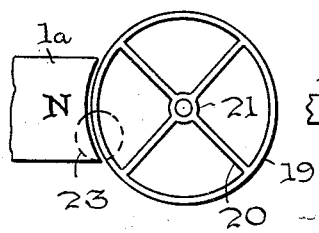
Figs. 2 and 3 are diagrams showing in plan and in elevation a more practicable form which the invention may take.
Figure 3:
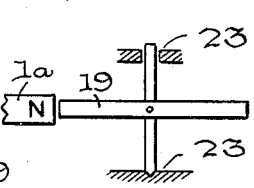

Figures 2 and 3 show diagrammatically the first working model made.

In this a thin strip of nickel-iron alloy, 1/100 inch thick, was formed into a ring 19, and this ring supported on a spider 20 on a spindle 21 arranged to run in bearings 22 and 23.

When heat was supplied at the point 23 the hoop rotated at approximately 150 to 200 R. P. M.

This arrangement, while indicating that thermo-dynamic exchange was taking place, was not good since the hoop of nickel iron itself was a magnetic conductor and, in the shape shown, rotating in a magnetic field eddy currents were set up within the ring itself and these eddy currents, reacting in accordance with Lenz's laws, opposed the force producing them and retarded rotation. The eddy currents were considerable, as subsequent experiment proved, but these eddy currents can be reduced to a minimum by using discs, or laminae.

Figure 9:
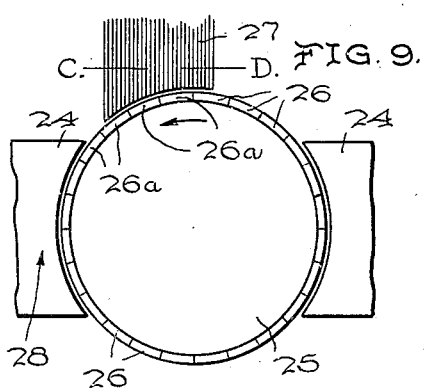
Fig. 9 shows diagrammatically a form the invention may take in one of its various forms, and Fig. 10 a cross section on line C—D.
Figure 7:
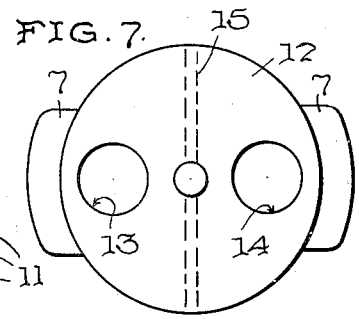
Fig. 7 shows a side view of a cap or hood for supplying heating and cooling medium.
Figure 6:
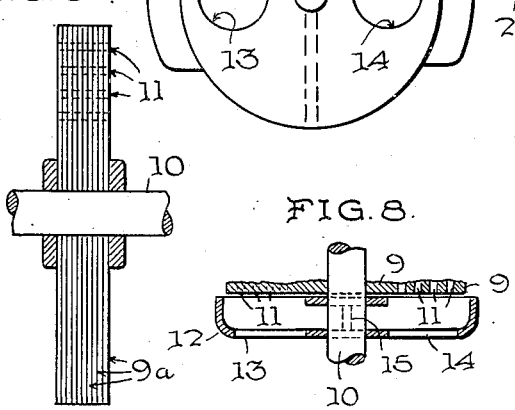
Fig. 6 is a front or edge view of the rotor.
Figure 8:
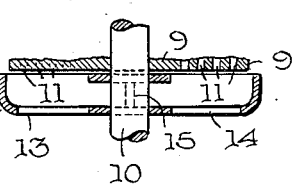
Fig. 8 is a cross section.
Figure 10:
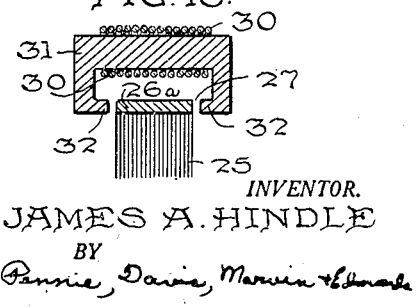

Figs. 9 and 10 show an application of the iron-nickel alloy to electric alternating ceiling or table fans and possibly to exhaust fans. In these figures there is a main alternating current field having poles 24, 24, and a rotor (or armature) 25 of laminated soft iron or cobalt iron, carrying, in this instance, conductors 26, 26 of iron-nickel alloy which are in the shape of thin strips, preferably parallel to the axis of rotation of the rotor.

This laminated soft iron or cobalt iron core of the rotor or armature serves to reduce the reluctance or magnetic resistance to the main magnetic flux between poles 24, 24. The magnetic resistance is varied by heating the iron-nickel strips in the air gap between the armature and the said poles so that through an angle of about 45° the magnetic resistance in the air gap is much greater than in other parts of the circumference of the armature.

An eddy current inducing field, indicated at 27, is directed at right angles to the main field, is used to induce eddy currents, and thus heating in the strips 26a, 26a when they come within its influence. For clearness, this eddy current inducing field is indicated in Figure 9 as angularly displaced relatively to the main field; but it will usually be so placed as to produce its field perpendicularly to, and cutting, the main field but having its centre, for example, at 28.

Through an angle of about 45° the strips 26a, 26a upon heating become less, or completely, non-magnetic and the main magnetic flux, taking the path of least reluctance, gives rise to a torque in an anti-clockwise direction, as shown by the arrow 29. The same condition is produced as indicated in Figure 4. In Figure 9, however, the auxiliary field is lifted up for clarity; but the side view shown in Figure 10 on line C—D of Figure 9 shows clearly the relative positions.

The eddy current inducing field is produced by passing an electric current through the windings 30 which are applied to the laminae of soft iron 31 and the field is thus produced between the poles 32, 32. The flux of the auxiliary field passes through the iron-nickel strips, 26a, 26a, which are opposite to the poles 32, 32, and since these are magnetic conductors and since these are in the line of the flux and are solid and are electrical conductors eddy currents will circulate in the strips 26a and cause local heating sufficient to demagnetise the strips momentarily, thus to cause the main flux between the poles 24, 24 to give rise to a torque. It will, however, be realised that this heating can be accomplished by other electrical means than those which produce eddy currents.

It will be seen that the apparatus according to Figures 9 and 10 is extremely simple. It is, for all practical purposes, a fly-wheel for receiving and converting heat directly into mechanical energy. Whilst doing thus, even if working for extended periods, renewals and repairs will be limited to the occasional renewal of, or repairs to, the bearings or to the field coils. The machine will have nearly perfect balance due to the purely rotational movement. It should be cheap to manufacture.

In the appended claims the term "magnet" is used in a broad sense and is intended to include an electromagnet as well as a permanent magnet.

I claim:

1. In an apparatus for the thermo-dynamic conversion of energy including a magnet having opposed poles, a rotor mounted for rotation between said opposed poles and in the magnetic field produced by said magnet, said rotor being formed at least in part of magnetic material capable of being rendered non-magnetic on heating to above a predetermined temperature and of recovering its magnetic properties upon cooling and means for directing heat to be converted into dynamic energy upon a part of said rotor to heat said part above said predetermined temperature, whereby said part of the rotor is rendered non-magnetic and the rotor thereby is caused to rotate in the magnetic field under the influence of the magnetic lines of flux effective thereon; the improvement in which the rotor is formed of a core of magnetic material and an outer cover of a nickel-iron alloy having different properties from that of the core.

2. In an apparatus for the thermo-dynamic conversion of energy including a magnet having opposed poles, a rotor mounted for rotation between said opposed poles and in the magnetic field produced by said magnet, said rotor being formed at least in part of magnetic material capable of being rendered non-magnetic on heating to above a predetermined temperature and of recovering its magnetic properties upon cooling and means for directing heat to be converted into dynamic energy upon a part of said rotor to heat said part above said predetermined temperature, whereby said part of the rotor is rendered non-magnetic and the rotor thereby is caused to rotate in the magnetic field under the influence of the magnetic lines of flux effective thereon; the improvement in which the rotor is formed of a core of magnetic material from the class consisting of soft iron and cobalt-iron alloy having an outer cover of a nickel-iron alloy.

3. In an apparatus for the thermo-dynamic conversion of energy including a magnet having opposed poles, a rotor mounted for rotation between said opposed poles and in the magnetic field produced by said magnet, said rotor being formed at least in part of magnetic material capable of being rendered non-magnetic on heating to above a predetermined temperature and of recovering its magnetic properties upon cooling and means for directing heat to be converted into dynamic energy upon a part of said rotor to heat said part above said predetermined temperature, whereby said part of the rotor is rendered non-magnetic and the rotor thereby is caused to rotate in the magnetic field under the influence of the magnetic lines of flux effective thereon; the improvement in which the rotor is formed of a core of magnetic material having an outer cover of a nickel-iron alloy containing at least 30% nickel and having different properties from that of the core.

4. In an apparatus for the thermo-dynamic conversion of energy including a magnet having opposed poles, a rotor mounted for rotation between said opposed poles and in the magnetic field produced by said magnet, said rotor being formed at least in part of magnetic material capable of being rendered non-magnetic on heating to above a predetermined temperature and of recovering its magnetic properties upon cooling and means for directing heat to be converted into dynamic energy upon a part of said rotor to heat said part above said predetermined temperature, whereby said part of the rotor is rendered non-magnetic and the rotor thereby is caused to rotate in the magnetic field under the influence of the magnetic lines of flux effective thereon; the improvement in which the rotor is formed of a core of discs of magnetic material positioned parallel to one another and an outer cover of a nickel-iron alloy having different properties from that of the core.

5. In an apparatus for the thermo-dynamic conversion of energy including a magnet having opposed poles, a rotor mounted for rotation between said opposed poles and in the magnetic field produced by said magnet, said rotor being formed at least in part of magnetic material capable of being rendered non-magnetic on heating to above a predetermined temperature and of recovering its magnetic properties upon cooling and means for directing heat to be converted into dynamic energy upon a part of said rotor to heat said part above said predetermined temperature, whereby said part of the rotor is rendered non-magnetic and the rotor thereby is caused to rotate in the magnetic field under the influence of the magnetic lines of flux effective thereon; the improvement in which the rotor is formed of a core of discs of magnetic material positioned parallel to one another and an outer cover formed of separate strips of a nickel-iron alloy and having different properties from that of the core.

6. In an apparatus for the thermo-dynamic conversion of energy including a magnet having opposed poles, a rotor mounted for rotation between said opposed poles and in the magnetic field produced by said magnet, said rotor being formed at least in part of magnetic material capable of being rendered non-magnetic on heating to above a predetermined temperature and of recovering its magnetic properties upon cooling and means for directing heat to be converted into dynamic energy upon a part of said rotor to heat said part above said predetermined temperature, whereby said part of the rotor is rendered non-magnetic and the rotor thereby is caused to rotate in the magnetic field under the influence of the magnetic lines of flux effective thereon; the improvement in which the rotor is formed of a core of discs of magnetic material positioned parallel to one another and an outer cover formed of separate strips of a nickel-iron alloy extending axially of the core and having different properties from that of the core.

7. In an apparatus for the thermo-dynamic conversion of energy including a magnet having opposed poles, a rotor mounted for rotation between said opposed poles and in the magnetic field produced by said magnet, said rotor being formed at least in part of magnetic material capable of being rendered non-magnetic on heating to above a predetermined temperature and of recovering its magnetic properties upon cooling and means for directing heat to be converted into dynamic energy upon a part of said rotor to heat said part above said predetermined temperature, whereby said part of the rotor is rendered non-magnetic and the rotor thereby is caused to rotate in the magnetic field under the influence of the magnetic lines of flux effective thereon; the improvement which comprises a cap member positioned opposite and close to one end of said rotor, a partition extending across said cap member and means whereby heating and cooling media, respectively, may be introduced into said cap member at opposite sides of said partition.

8. An apparatus as set forth in claim 7 in which the rotor comprises a plurality of discs arranged in parallel relation on a central shaft and have holes in them, whereby during rotation of the rotor the holes in said discs successively are brought opposite the spaces within said cap member, at the opposite side of the partition therein, to which cooling and heating media may be introduced.

9. In an apparatus for the thermo-dynamic conversion of energy including a magnet having opposed poles, a rotor mounted for rotation between said opposed poles and in the magnetic field produced by said magnet, said rotor being formed at least in part of magnetic material capable of being rendered non-magnetic on heating to above a predetermined temperature and of recovering its magnetic properties upon cooling and means for directing heat to be converted into dynamic energy upon a part of said rotor to heat said part above said predetermined temperature, whereby said part of the rotor is rendered non-magnetic and the rotor thereby is caused to rotate in the magnetic field under the influence of the magnetic lines of flux effective thereon; the improvement in which the rotor has an outer sheath on its periphery of strips of iron-nickel alloy, and electrical means are provided to produce eddy currents and heating in said strips to render them non-magnetic as they pass in succession between the poles of said magnet.

JAMES ARTHUR HINDLE.